United States Patent [19]
Haesly et al.

[11] 4,327,964
[45] May 4, 1982

[54] SNAP-ACTION FIBER OPTIC CONNECTOR

[75] Inventors: Barry F. Haesly; Richard D. Harris, Richardson; Eugene G. Dierschke, Dallas; Michael R. Hailey, Garland, all of Tex.

[73] Assignee: Texas Instruments Incorporated, Dallas, Tex.

[21] Appl. No.: 105,814

[22] Filed: Dec. 20, 1979

[51] Int. Cl.³ .............................................. G02B 7/26
[52] U.S. Cl. .............................. 350/96.20; 350/96.21
[58] Field of Search ............... 350/96.20, 96.21, 96.22; 250/227; 339/46

[56] References Cited

U.S. PATENT DOCUMENTS

| | | | |
|---|---|---|---|
| 4,205,898 | 6/1980 | Matthews et al. | 350/96.21 |
| 4,217,030 | 8/1980 | Howarth | 350/96.21 |
| 4,240,695 | 12/1980 | Evans | 350/96.21 |

FOREIGN PATENT DOCUMENTS

| | | | |
|---|---|---|---|
| 2636997 | 2/1978 | Fed. Rep. of Germany | 350/96.21 |
| 2754347 | 6/1979 | Fed. Rep. of Germany | 350/96.21 |
| 7710251 | 3/1979 | Netherlands | 350/96.21 |

*Primary Examiner*—John D. Lee
*Attorney, Agent, or Firm*—Melvin Sharp; Richard L. Donaldson; Gary C. Honeycutt

[57] ABSTRACT

A simple low-cost fiber optic connector having a body member into which a ferrule is inserted and held in place by an expandable retainer which allows the ferrule to snap out of the assembly upon the application of a substantial pulling force, and thereby avoid damage to the fiber or to the connector. A preferred embodiment includes two aligned ferrules inserted into opposite sides of the body such that their tips meet at the center to interconnect the ends of two optical fibers. A multiple-ferrule embodiment is also contemplated.

4 Claims, 8 Drawing Figures

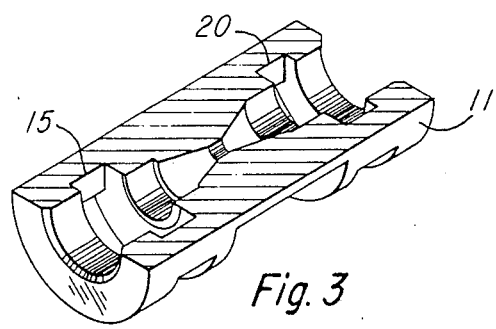
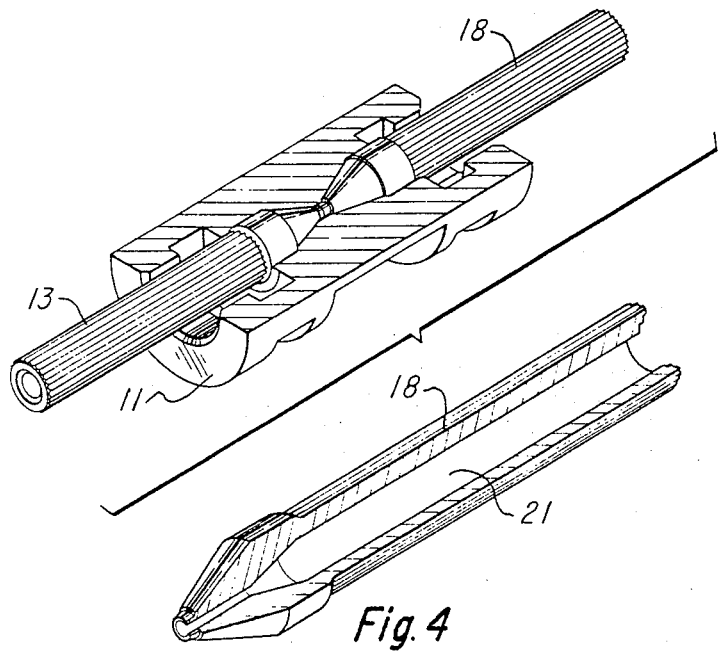

SNAP-ACTION FIBER OPTIC CONNECTOR

This invention relates to optical fibers, and more particularly to means for connecting an optical fiber end to an optical source, or to an optical detector; or means for interconnecting the ends of two fibers.

For several years there has been a recognized need for a simple low-cost fiber optic connector. There are two types of fiber optic connectors on the market today. One is the screw type and the other is the latch type. The screw type requires expensive tooling to fabricate the screw threads, and is less convenient to use, particularly when space is restricted. Moreover, such types are usually inherently limited to a single connection channel. The latch type connectors snap together easily but lock into position after insertion and require a positive transverse or rotational force to release and disconnect. Most latch type connectors incorporate a spring to maintain pressure on the connection which further increases the cost.

Accordingly, it is an object of the present invention to provide a simple low-cost fiber optic connector which pulls or snaps apart whenever the applied pulling force exceeds a certain threshold value, whereby permanent damage to the fiber optic cable and/or the connector is avoided.

One aspect of the present invention is embodied in a connector which includes a body member having a cavity into which a ferrule extends, and is held in place by means of a retainer which allows the ferrule to snap out of the assembly upon the application of a substantial pulling force.

In a specific embodiment, the ferrule has a hole in the center into which the end of an optical fiber is placed. The hole diameter at the tapered tip end of the ferrule is slightly larger than the optical fiber diameter. The hole diameter increases to the other end of the ferrule to enable the optical fiber jacket and/or strength members to fit into the ferrule. That portion of the ferrule which extends into the body member includes a short section of increased outside diameter for engagement with the retainer as further explained below. Other ferrules are readily available for use in the assembly of the invention.

The end of an optical fiber is affixed into the ferrule by means of epoxy adhesive, for example, with a short piece of fiber extending beyond the end of the ferrule tip. The optical fiber is then cut and the exposed end is lapped and polished. Other adhesives and techniques for fixing the fiber are readily available.

The retainer which releasably holds the ferrule in position in the connector body is preferably a U-shaped springlike member which includes an expandable opening located to partially surround the ferrule and thereby hold the ferrule in place. The normal diameter of the opening in the retainer is substantially equal to the smaller outside diameter of the ferrule. The retainer opening is expandable to accommodate the short section of increased ferrule diameter.

The body member includes a transverse slot which intersects with the cavity into which the ferrule fits. The retainer member is insertable into the slot and is held in place by a shoulder configuration in the body member.

An embodiment having a single ferrule and single retainer includes means for mounting an optical source of an optical detector in suitable alignment with the ferrule tip so that the detector receives optimum light intensity from the end of the ferrule tip; or such that light emanating from the optical source enters the ferrule tip with optimum efficiency.

A preferred embodiment includes a body member which accommodates two ferrules from opposite ends and which correspondingly includes two retainers; one for each ferrule.

FIG. 3 is a cutaway perspective view partially in cross section of the body member shown in FIG. 2.

FIG. 4 is a perspective view of a ferrule of the assembly of FIGS. 1-3, partially in cross section.

Figure 1:
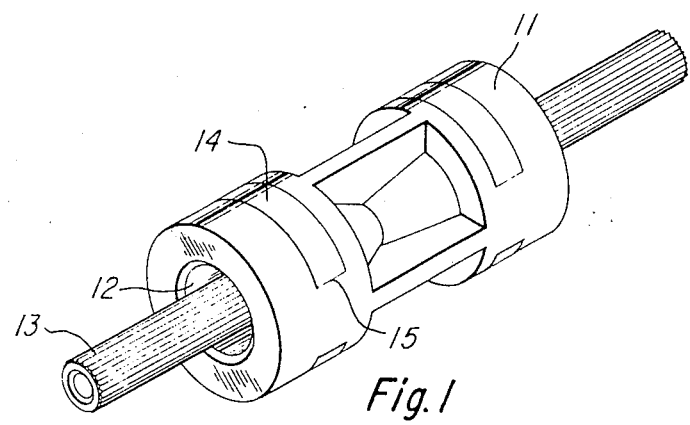
FIG. 1 is an enlarged perspective view of one embodiment of the invention.
Figure 2:
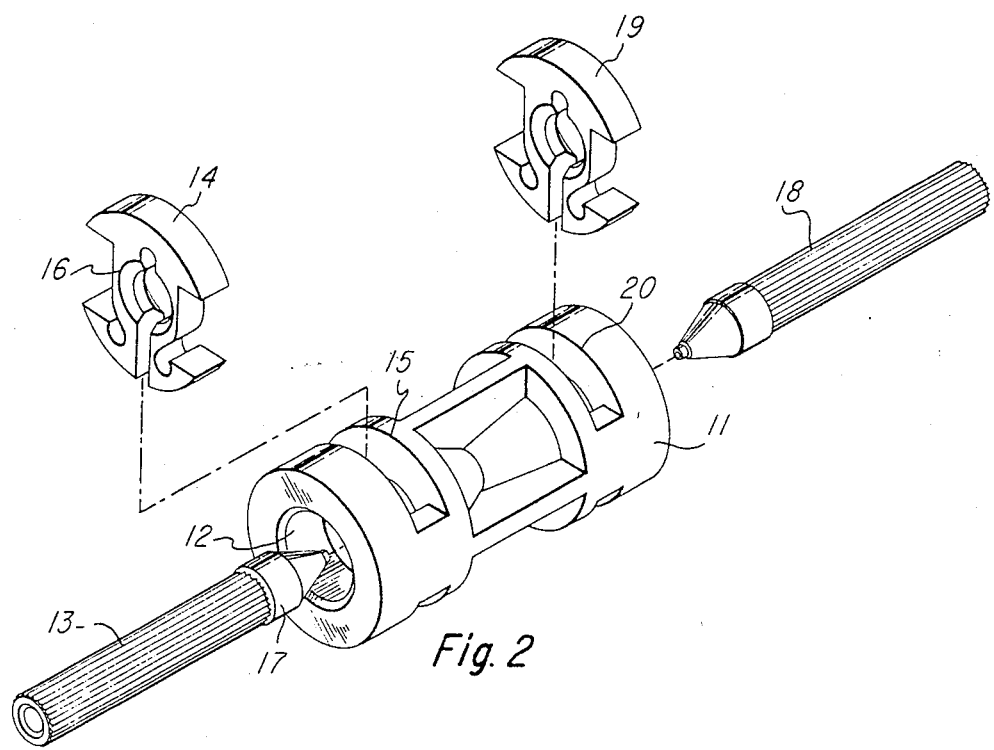
FIG. 2 is a disassembled perspective view of the embodiment of FIG. 1 showing the separate parts of the assembly.

The embodiment of FIGS. 1 and 2 includes body member 11 having a cavity 12 into which ferrule 13 extends. Retainer 14 is inserted into slot 15 which extends transversely to the axis of ferrule 13. Opening 16 in the retainer is expandable to accommodate the enlarged diameter section 17 of ferrule 13. When fully inserted, the large diameter section of the ferrule is fixed in place just beyond the opening 16 in the retainer.

The assembly is symmetrical and includes ferrule 18 in combination with retainer 19 which extends into slot 20. The relationship of these parts is the same as for ferrule 13 and retainer 14. In this embodiment, the ends of two optical fibers are interconnected. That is, the end of one fiber extends into ferrule 13 and the other extends into ferrule 18 such that the assembled connector permits light to pass from one fiber into the other. It will be readily understood of course that the body member 11 may be provided internally with means for mounting an optical detector or means for mounting a light-emitting device such that a single ferrule and single retainer will be included for the purpose of coupling light from the end of a fiber to a detector or from an emitter into a fiber. See for example copending application Ser. No. 009,976 showing a device that includes such internal mounting means for a detector or emitter.

In FIG. 3, the cutaway view of body 11 shows the interior construction. Note particularly that slots 15 and 20 extend completely through the body member such that the retainers 14 and 19 extend completely through the body member and have the same outside diameter as body 11, fitting flush with the outside diameter of body member 11.

In FIG. 4, the interior detail of ferrule 18 is shown including the tapered bore 21 wherein an optical fiber is to be secured for example by an epoxy adhesive. Also, the relationship of the interior ends of the ferrules in the completed assembly is shown in combination with a cutaway perspective of body 11.

Figure 5:
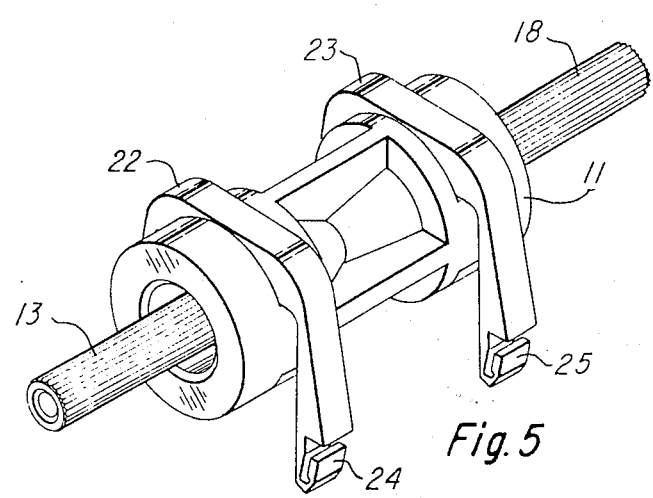
FIG. 5 is an enlarged perspective view of another embodiment of the invention.
Figure 6:
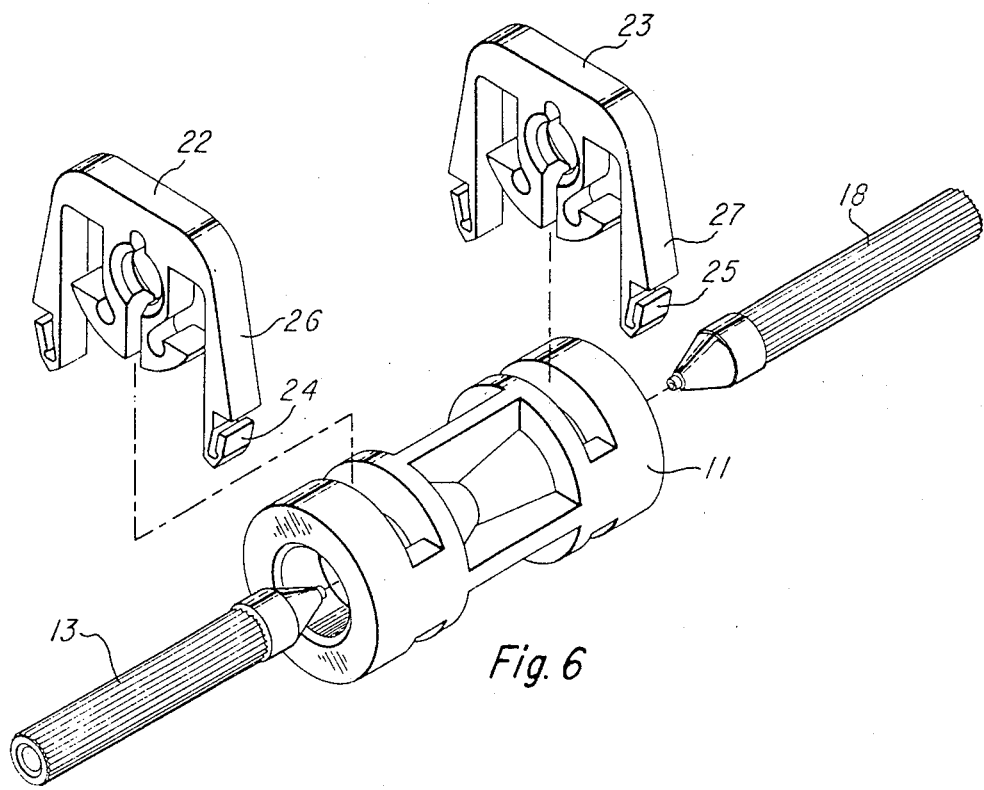
FIG. 6 is a disassembled perspective view of the embodiment of FIG. 5.

FIGS. 5 and 6 show an alternate embodiment of the invention which includes body member 11 and ferrules 13 and 18 are before, but which includes retaining members 22 and 23 in place of retainers 14 and 19, respectively. These alternate retainers fit into body member 11 exactly as retainers 14 and 19; however, retainers 22 and 23 includes a pair of external arms 26 and 27, respectively, which are adapted for mounting the assembly on a circuit board. The ends 24 and 25 of external arms 26 and 27, respectively, are shaped to be inserted through slots in a circuit board in order to provide fixed attachment of the assembly of the invention.

Figure 7:
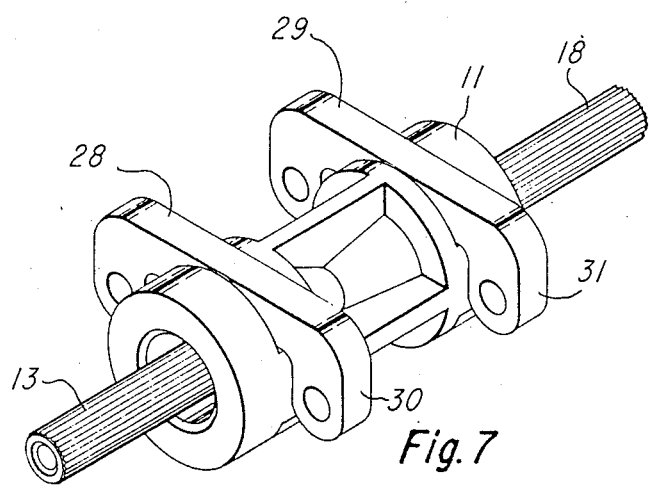
FIG. 7 is an enlarged perspective view of the third embodiment of the invention.
Figure 8:
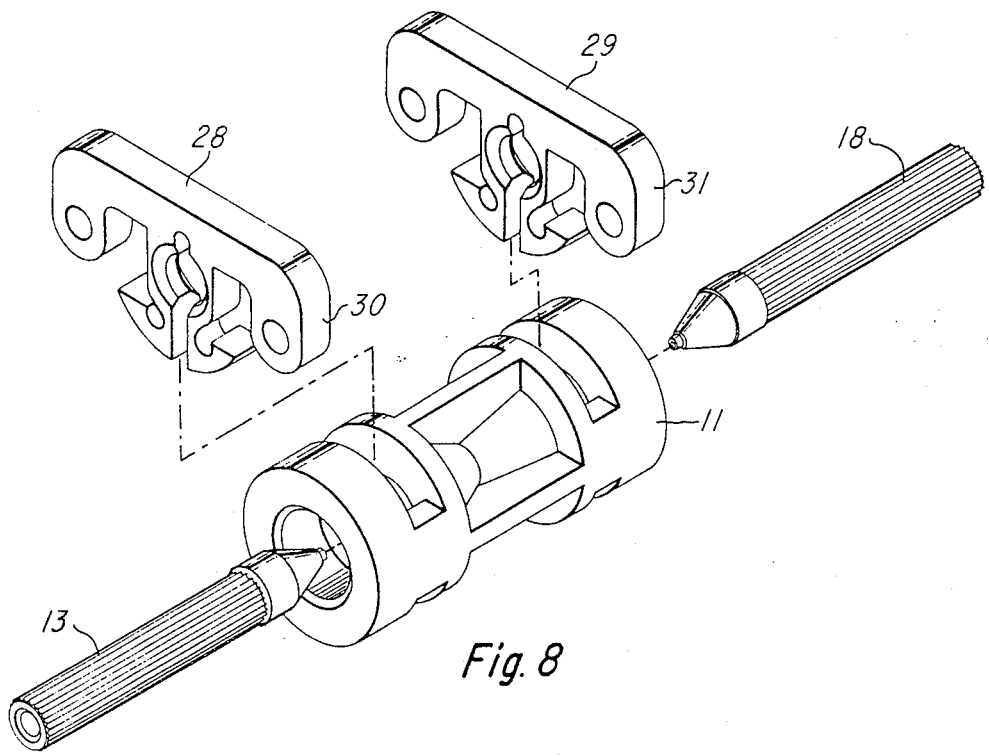
FIG. 8 is a disassembled perspective view of the embodiment of FIG. 7.

A third embodiment of the invention as shown in FIGS. 7 and 8 again includes body member 11 and ferrules 13 and 18; and differs from the previous embodiments in that retainers 28 and 29 are substituted for the other retainer members. These retainers have external arms 30 and 31, respectively, designed for attachment of the assembly to an instrument chassis or equivalent base member.

Again, that portion of the retainer which fits into the interior of body 11 is the same in each of the embodiments.

A wide variety of metals and plastics is available for use in fabricating the connectors of the invention. Nylon or a similar plastic is a preferred material from the standpoint of cost, strength and reliability. Injection molding is a preferred method for making the parts.

In a specific embodiment, the body member is one inch long and has an outside diameter of ⅜ inch. The transverse slots are ⅛ inch wide and spaced apart by ⅝ inch at their centers. The retainers are ¼ inch wide and their central opening is 1/5 inch expandable to ¼ inch, and chamfered on both sides at a 45° angle. The ferrules are 1/5 inch o.d. except for the enlarged section of ¼ in o.d. near the tapered end.

Obviously, none of these dimensions is critical. They are disclosed by way of example only.

We claim:

1. A connector comprising:
   (a) a body member having a cavity therein;
   (b) a ferrule extending into said cavity;
   (c) means in combination with said body for retaining said ferrule in place, and for mounting of the connector on a selected surface, comprising an interchangeable elastic member which allows said ferrule to snap out of the assembly upon application of a substantial pulling force, said member having molded extensions which are directed past said body member from that side of the body wherein the member is inserted, to the far side of said body, said extensions having compressable latching fingers for insertion into openings in a mounting surface, said fingers resuming their normal position after compression while being inserted, to secure the connector assembly to said mounting surface.

2. A connector as in claim 1, wherein said means for mounting comprises said interchangeable member, said member having molded extensions, said extensions extending out away from the body of said connector and having an area through which an opening exists, for attachment to a mounting means with a fastener.

3. A connector as in claim 2, wherein said mounting means is a metal bracket.

4. A connector as in claim 1, wherein said mounting surface is a printed circuit board.

* * * * *